J. Shugert,
Journal Lubricator.
Nº 2,527. Patented Apr. 1, 1842.
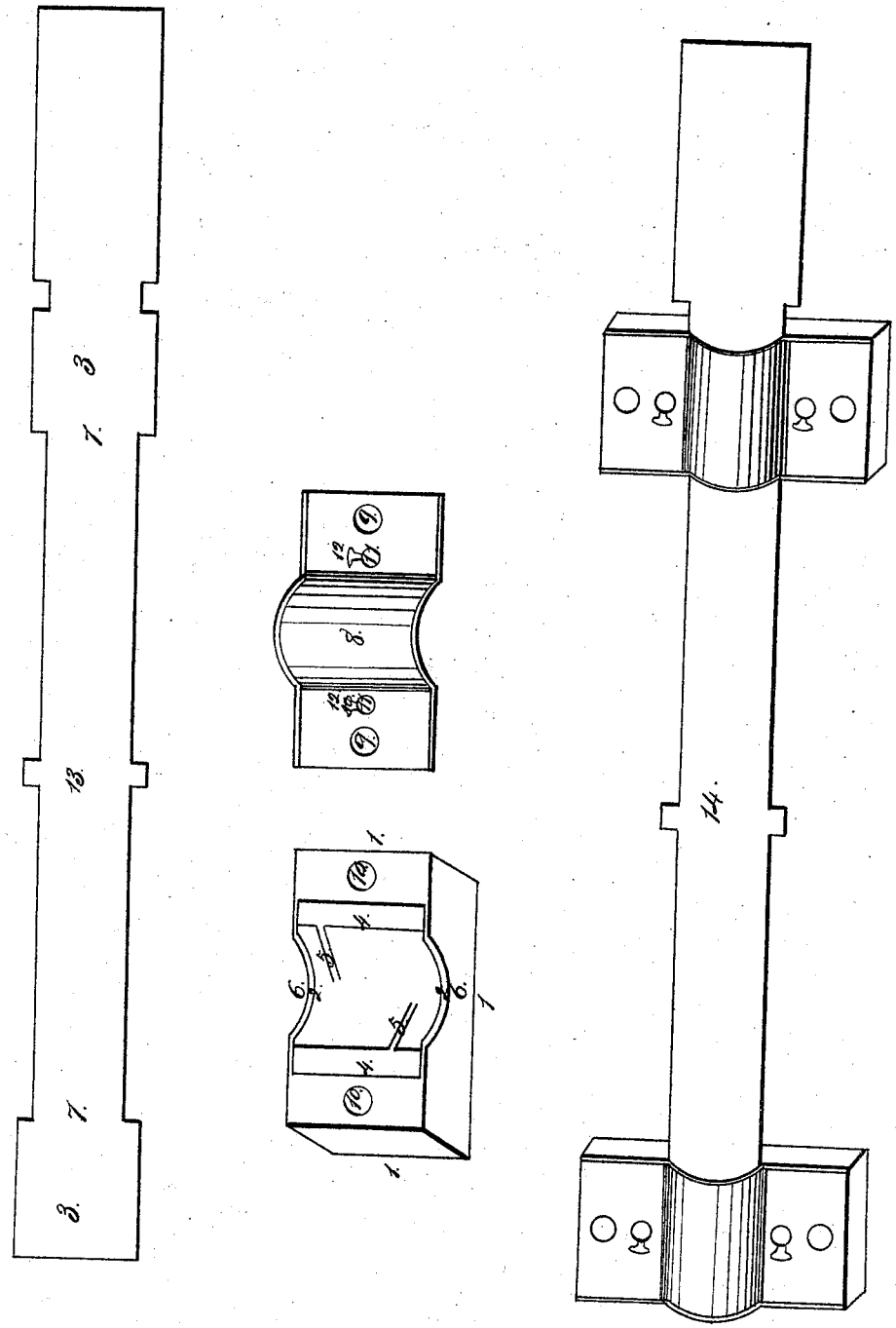

UNITED STATES PATENT OFFICE.

JOHN SHUGERT, OF ELIZABETH, PENNSYLVANIA.

SELF-OILING BOX FOR GUDGEONS, &c.

Specification of Letters Patent No. 2,527, dated April 1, 1842.

*To all whom it may concern:*

Be it known that I, JOHN SHUGERT, of the borough of Elizabeth, county of Allegheny, and Commonwealth of Pennsylvania, have invented a new and improved mode of applying oil and every substitute for oil to the journals or other revolving parts of every kind of machinery at the point of bearing to prevent and overcome friction by the application of oil or any substitute for oil, called "the self-oiling box and journal," and I do hereby declare that the following is a full and exact description in connection with the drawings referred to by the figures.

The nature of my invention consists in providing a box, of a shape and size suitable for the admission of the machinery to be received by it, which box may be made of wood, metal, or of such other material as the mechanic may prefer.

Figures 1, 1, 1, represent the ends and bottom of the box outside. In the center or other convenient part of this box, I make a concave bed, Fig. 2, of a size and form suitable for the reception of the journal, Fig. 3, 3, or other revolving part of machinery designed to run in it. On each side of this concave bed in the box, I construct a reservoir Figs. 4, 4, of a size to hold any desired quantity of oil or its substitute, the bottom of each being level with the bottom of the concave bed in the box. From the bottom of each of these reservoirs, I make a channel, Figs. 5, 5, communicating with, and for the purpose of conducting the oil or its substitute, to the concave bed in the box and to the journal or the part of machinery running in this bed. Through the inner side of this box, if it receives only the end of a shaft, and through both sides if the shaft passes beyond the box, I cut a circular aperture, Figs. 6, 6, for the reception of the neck of the shaft, Figs. 7, 7, thus leaving the sides higher than the concave bed, to prevent the oil from escaping. Over the box and journal I place a concave cap or lid, Fig. 8, neatly fitted and of the size of the top of the box and secured by screws, passing through the apertures Figs. 9, 9, into the solid part of the box, into apertures Figs. 10, 10. Through the cap, and directly over the reservoirs, I make apertures Figs. 11, 11, through which the oil or its substitute is to be poured into the reservoirs. These apertures I secure with stoppers, Figs. 12, 12, that no dirt may enter the reservoirs. I make the journal, Fig. 3, as shown on the shaft Fig. 13, larger than that part of the shaft next to the box, forming a shoulder at each end when the shaft passes through the box, and at the inner end when it does not, which journal, being thus made larger than the neck of the shaft and secured in the concave bed of the box, can have no lateral motion.

Fig. 14, represents a shaft secured in the boxes, one end passing through to receive gearing.

What I claim as my invention and desire to secure by Letters Patent, is—

The arrangement of the reservoirs of oil on each side of the box, their bottom being on a level with the bottom of the box, and being provided with channels leading thereto, in combination with gudgeons or journals made larger than the shaft next to the box, so that the oil in the bottom of the box may be high enough for the journal to revolve in and not leak out of the opening in the box through which the shaft passes, all as herein described.

JOHN SHUGERT.

Witnesses:
 JOHN TASSEY,
 L. C. JUDSON.